US010742836B2

(12) United States Patent
Saito

(10) Patent No.: US 10,742,836 B2
(45) Date of Patent: Aug. 11, 2020

(54) SERVER RECEIVING FIRST FILE FROM TERMINAL DEVICE AND TRANSMITTING SECOND FILE TO FIRST COMMUNICATION DEVICE OR SECOND COMMUNICATION DEVICE

(71) Applicant: BROTHER KOGYO KABUSHIKI KAISHA, Nagoya, Aichi (JP)

(72) Inventor: Ken Saito, Tokoname (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/439,907

(22) Filed: Jun. 13, 2019

(65) Prior Publication Data
US 2019/0394351 A1   Dec. 26, 2019

(30) Foreign Application Priority Data
Jun. 22, 2018   (JP) .................................. 2018-118905

(51) Int. Cl.
*G06F 15/00* (2006.01)
*G06F 3/12* (2006.01)
(Continued)

(52) U.S. Cl.
CPC ....... *H04N 1/32101* (2013.01); *G06F 3/1203* (2013.01); *G06F 3/1232* (2013.01); *G06F 21/6209* (2013.01); *H04N 1/00312* (2013.01)

(58) Field of Classification Search
CPC ............ H04N 1/32101; H04N 1/00312; G06F 3/1203; G06F 3/1232; G06F 21/6209
(Continued)

(56) References Cited

U.S. PATENT DOCUMENTS

2006/0044607 A1 * 3/2006 Kato ..................... G06F 3/1222
                                                           358/1.15
2010/0185858 A1   7/2010 Nishimi et al.
(Continued)

FOREIGN PATENT DOCUMENTS

| JP | 2007-034492 A | 2/2007 |
| JP | 2010-170235 A | 8/2010 |
| JP | 2017-084217 A | 5/2017 |

*Primary Examiner* — Douglas Q Tran
(74) *Attorney, Agent, or Firm* — Scully, Scott, Murphy & Presser, PC

(57) ABSTRACT

In a server, a memory stores first correlation information for correlating first group identification information with both first device information assigned to a first communication device and second device information assigned to a second communication device. A first group includes the first communication device and the second communication device. In a case where device information matching the first device information and authentication information matching the first authentication information are received from the first communication device, the processor transmits to the first communication device a second file generated using a first file which is stored correlated with the first authentication information in the memory. In a case where device information matching the second device information and authentication information matching the first authentication information are received from the second communication device, the processor transmits to the second communication device the second file.

11 Claims, 9 Drawing Sheets

(51) Int. Cl.
*G06K 1/00* (2006.01)
*H04N 1/32* (2006.01)
*G06F 21/62* (2013.01)
*H04N 1/00* (2006.01)

(58) Field of Classification Search
USPC .............................. 358/1.1, 1.15, 1.13, 1.14
See application file for complete search history.

(56) References Cited

U.S. PATENT DOCUMENTS

2011/0134472 A1* 6/2011 Kimura ................. G06F 3/1203
358/1.15
2017/0126926 A1 5/2017 Saito

* cited by examiner

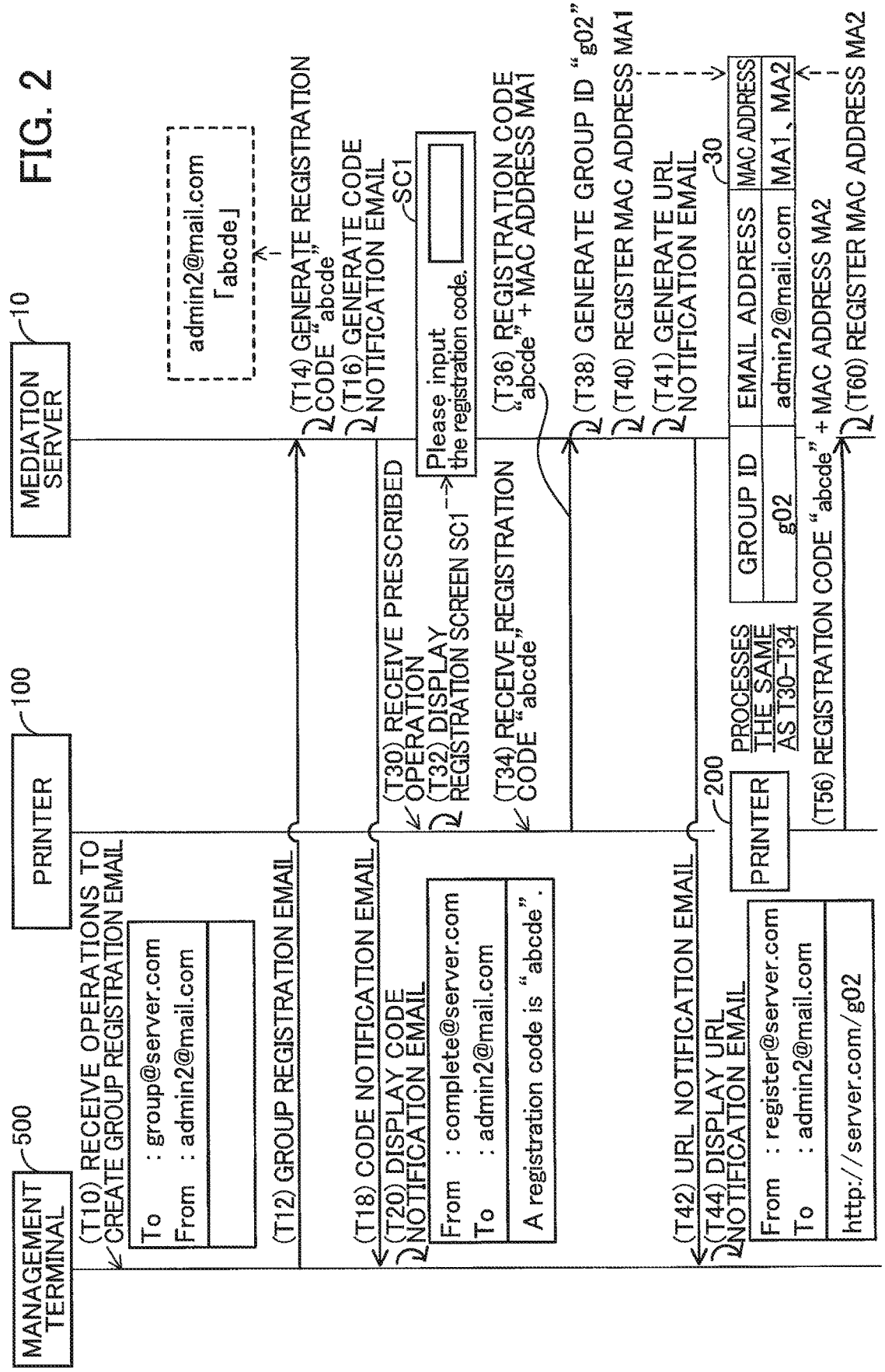

FIG. 3

JOB REGISTRATION PROCESS FOR GROUP

USER TERMINAL (600) — MEDIATION SERVER (10)

Table 30:
| GROUP ID | EMAIL ADDRESS | MAC ADDRESS |
|---|---|---|
| g01 | admin1@mail.com | MA0, MA1 |
| g02 | admin2@mail.com | MA1, MA2 |

Table 32:
| INDIVIDUAL ID | MAC ADDRESS |
|---|---|
| s00 | MA0 |

(T100) RECEIVE GROUP URL "http://server.com/g02"
(T102) HTTP REQUEST (GROUP URL)
(T104) PRINT SETTINGS SCREEN DATA
(T106) DISPLAY PRINT SETTINGS SCREEN SC2

SC2:
File: file2.pdf
Size: A4
color ● monochrome ○

(T108) RECEIVE SELECTION OF FILE AND PRINT SETTINGS
(T110) JOB REGISTRATION REQUEST (FILE (file2.pdf), PRINT SETTINGS INFORMATION SI2, GROUP ID "g02")
(T112) GENERATE JOB ID "j002"
(T114) PERFORM PASSWORD GENERATION PROCESS (FIG. 4), AND GENERATE AND REGISTER PASSWORD "YYY"

Table 34:
| GROUP ID OR INDIVIDUAL ID | JOB ID | FILE NAME | PRINT SETTINGS INFORMATION | PASSWORD |
|---|---|---|---|---|
| g01 | j001 | file1.pdf | SI1 | XXX |
| g02 | j002 | file2.pdf | SI2 | YYY |

(T116) PASSWORD "YYY"
(T118) DISPLAY PASSWORD "YYY"

SERVER RECEIVING FIRST FILE FROM TERMINAL DEVICE AND TRANSMITTING SECOND FILE TO FIRST COMMUNICATION DEVICE OR SECOND COMMUNICATION DEVICE

CROSS REFERENCE TO RELATED APPLICATION

This application claims priority from Japanese Patent Application No. 2018-118905 filed Jun. 22, 2018. The entire content of the priority application is incorporated herein by reference.

TECHNICAL FIELD

The present disclosure relates to a server that generates a file based on a file received from a terminal device and transmits the generated file to a communication apparatus.

BACKGROUND

A conventional mediation server receives image data from a mobile device and controls a multifunction peripheral (MFP) to print an image based on this image data. Specifically, the mediation server transmits to the MFP a QR code (registered trademark) that includes a job ID to the MFP in response to a request from the MFP. The MFP displays this QR code. Using a reading unit of the mobile device, the user of the device scans the QR code displayed on the MFP to acquire the job ID. After acquiring the job ID, the mobile device transmits an upload request to the mediation server that includes image data and the job ID. After the image data has been uploaded to the mediation server, the MFP transmits an image data acquisition request including the job ID to the mediation server and subsequently receives the image data from the mediation server and prints the image based on the image data.

SUMMARY

In the conventional technique, an MFP different from the MFP that acquired the job ID from the mediation server cannot receive the image data from the mediation server since the different MFP does not know the job ID.

In view of the foregoing, it is an object of the present disclosure to provide a technology in which a server that receives a first file from a terminal device and transmits a second file obtained based on the first file to any of two or more communication apparatuses included in a certain group.

In order to attain the above and other objects, the disclosure provides a server. The server includes a communication interface, a memory, and a processor. The communication interface is configured to communicate with a terminal device. The memory stores first correlation information for correlating first group identification information with both first device information and second device information. The first group identification information is for identifying a first group. The first device information is assigned to a first communication device. The second device information is assigned to a second communication device. The first correlation information indicates that the first group includes the first communication device and the second communication device. The processor is configured to perform: receiving the first group identification information and a first file from the terminal device; in a first case where the first group identification information and the first file are received from the terminal device: storing in the memory the first file and first authentication information to correlate both the first file and the first authentication information with the first group identification information; and transmitting the first authentication information to an external apparatus via the communication interface; in a second case where device information matching the first device information correlated with the first group identification information and authentication information matching the first authentication information are received from the first communication device via the communication interface after the transmitting the first authentication information is performed, transmitting to the first communication device a second file generated using the first file which is stored correlated with the first authentication information in the memory; and in a third case where device information matching the second device information correlated with the first group identification information and authentication information matching the first authentication information are received from the second communication device via the communication interface after the transmitting the first authentication information is performed, transmitting to the second communication device the second file.

According to another aspect, the disclosure provides a non-transitory computer readable storage medium storing a set of program instructions for a server. The server includes a communication interface configured to communicate with a terminal device, and a memory storing first correlation information for correlating first group identification information with both first device information and second device information. The first group identification information is for identifying a first group. The first device information is assigned to a first communication device. The second device information is assigned to a second communication device. The first correlation information indicates that the first group includes the first communication device and the second communication device. The set of program instructions includes: receiving the first group identification information and a first file from the terminal device; in a first case where the first group identification information and the first file are received from the terminal device: storing in the memory the first file and first authentication information to correlate both the first file and the first authentication information with the first group identification information; and transmitting the first authentication information to an external apparatus via the communication interface; in a second case where device information matching the first device information correlated with the first group identification information and authentication information matching the first authentication information are received from the first communication device via the communication interface after the transmitting the first authentication information is performed, transmitting to the first communication device a second file generated using the first file which is stored correlated with the first authentication information in the memory; and in a third case where device information matching the second device information correlated with the first group identification information and authentication information matching the first authentication information are received from the second communication device via the communication interface after the transmitting the first authentication information is performed, transmitting to the second communication device the second file.

BRIEF DESCRIPTION OF THE DRAWINGS

The particular features and advantages of the disclosure as well as other objects will become apparent from the following description taken in connection with the accompanying drawings, in which:

FIG. 2 is a sequence diagram illustrating a group registration process according to the first embodiment;

FIG. 3 is a sequence diagram illustrating a job registration process for a group according to the first embodiment;

DETAILED DESCRIPTION

First Embodiment

Structure of a Communication System 2

Figure 1:
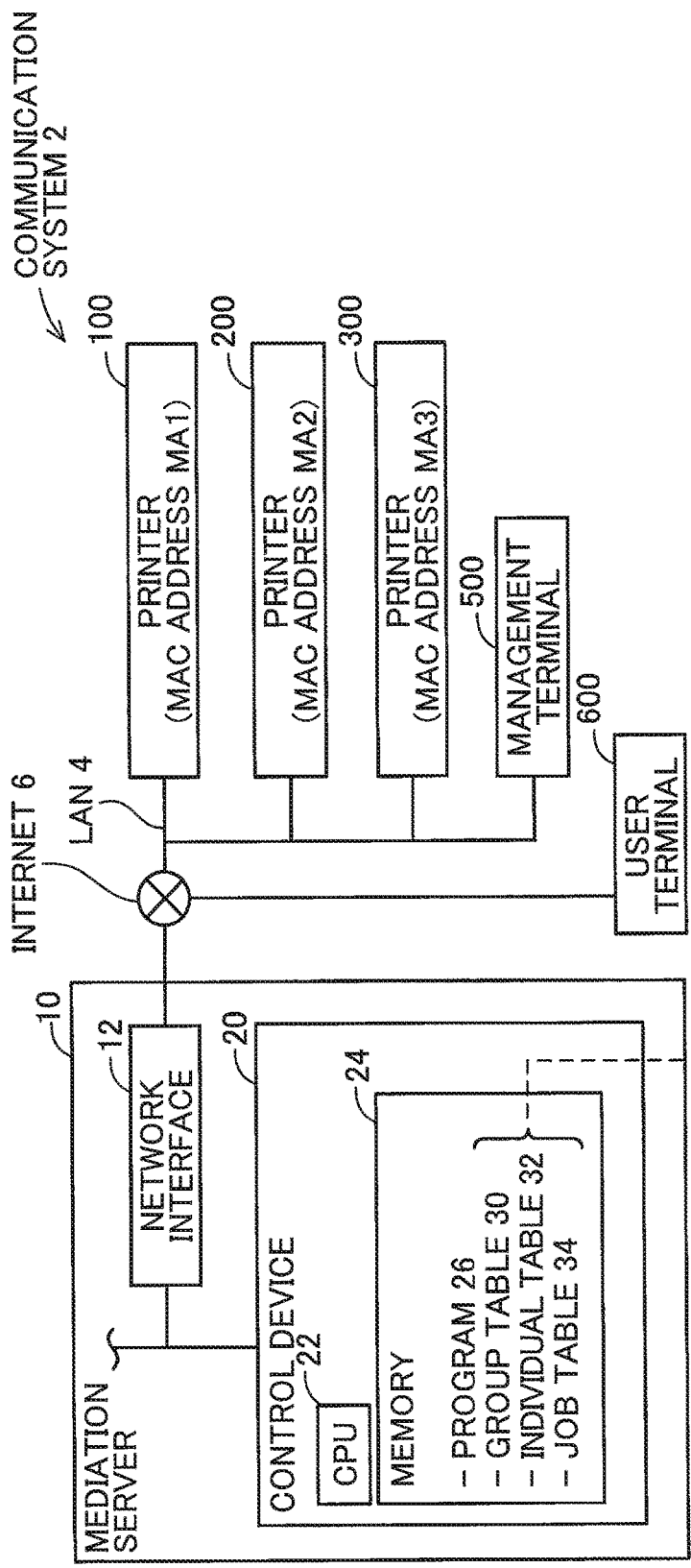
FIG. 1 is an explanatory diagram illustrating a communication system including a mediation server according to a first embodiment.

FIG. 1 shows a communication system 2. The communication system 2 is provided with a mediation server 10; a plurality of printers 100, 200, and 300; a management terminal 500; and a user terminal 600. The printers 100-300 and the management terminal 500 are connected to the same local area network (LAN) 4. The LAN 4 may be either a wired LAN or a wireless LAN. The management terminal 500 and the user terminal 600 may be desktop computers, notebook computers, or other mobile terminals.

The LAN 4 is further connected to an Internet 6. The mediation server 10 is provided on the Internet 6. A device connected to the LAN 4 (e.g., the management terminal 500) can communicate with servers on the Internet 6 (e.g., the mediation server 10) through the LAN 4 and Internet 6.

The printers 100-300 are peripheral devices (devices peripheral to the management terminal 500) that can implement printing functions. Media Access Control (MAC) addresses are assigned to the printers 100-300. Specifically, the MAC address MA1 is assigned to the printer 100, the MAC address MA2 is assigned to the printer 200, and the MAC address MA3 is assigned to the printer 300.

Structure of the Mediation Server 10

The mediation server 10 is provided on the Internet 6 by the vendor of the printer 100 and the like. The mediation server 10 mediates communications necessary for printing images between terminal devices (e.g., the user terminal 600) and printers (e.g., the printer 100). Specifically, the mediation server 10 receives a file representing an image from a terminal device, converts the file to image data in a data format that a printer can interpret, and transmits the print data to the printer. Implementing these processes with the mediation server 10 eliminates the need to install driver programs on the terminal devices.

The mediation server 10 is provided with a network interface 12, and a control device 20. The network interface 12 is connected to the Internet 6. The control device 20 is provided with a CPU 22, and a memory 24. The memory 24 is configured of volatile memory, nonvolatile memory, and the like. The memory 24 stores a program 26, a group table 30, an individual table 32, and a job table 34. The CPU 22 executes various processes according to the program 26 stored in the memory 24.

The group table 30 is used to manage groups that include two or more printers. Specifically, for each of one or more groups, the group table 30 stores a record including a group identifier (group ID), an email address, and a list of two or more MAC addresses so that the group ID, the email address, and the list of two or more MAC addresses are correlated with one another. The group identifier (group ID) is for identifying the group. The email address is an email address of the user managing the group. The two or more MAC addresses are assigned to the two or more printers in the group. The mediation server 10 generates the group ID. When a MAC address is received from a printer together with a registration code, the mediation server 10 stores the MAC address in a corresponding record of the group table 30. This process will be described later with reference to FIG. 2.

The individual table 32 is used to provide individual identification information that identifies a single printer only. Specifically, for each of one or more printers, the individual table 32 stores a record including an individual ID for identifying only that printer, and the MAC address assigned to that printer so that the individual ID and the MAC address are correlated with each other. The mediation server 10 generates the individual IDs. When a MAC address is received from a printer, the mediation server 10 stores this MAC address in a corresponding record of the individual table 32. This process will be described later with reference to FIG. 5.

For each of one or more print jobs, the job table 34 stores a record including a group ID or an individual ID, a job ID, the filename of the file, print settings information, and a password so that the group ID or the individual ID, the job ID, the filename, and the password are correlated with one another. Here, the group ID or the individual ID is for identifying a group of printers or an individual printer to be used for executing the print job. The job ID is for identifying the print job. The filename of the file includes image data representing the image to be printed according to the print job. The print settings information specifies print settings for executing the print job (paper size, color, copies, duplex option, and the like). The mediation server 10 generates the job ID and the password. When a file and print settings information are received from a terminal device, the mediation server 10 stores the filename and print settings information in a record of the job table 34. This process will be described later with reference to FIG. 3.

Group Registration Process

Next, a process for registering MAC addresses in association with a group ID will be described with reference to FIG. 2. For simplification, the mediation server 10 will be used as the subject in place of the CPU 22 when describing processes that the CPU 22 of the mediation server 10 executes according to the program 26. Further, since it is understood that all communications performed by the mediation server 10 are implemented via the network interface 12, the following description omits the expression "via the network interface 12."

In T10 of FIG. 2, the user performs operations on the management terminal 500 to start a software program for creating an email message (i.e., a mail program), and creates a group registration email. The group registration email is an email message used to request the mediation server 10 to generate a group ID and to register MAC addresses. The group registration email includes the destination address "group@server.com," and the source address "admin2@mail.com." The address "group@server.com" is constructed from the character string "group" and the domain name of the mediation server 10 "server.com." The character string "group" is a command used to request the mediation server 10 to generate a registration code for registering MAC addresses. The source address "admin2@mail.com" is the email address for the user managing the management terminal 500.

After the user of the management terminal 500 has created a group registration email in T10, in T12 the management terminal 500 transmits the group registration email to a mail server (not shown). Thereafter, the mail server transmits the group registration email to the mediation server 10 specified by the domain name in the destination address "group@server.com."

Upon receiving the group registration email from the management terminal 500 in T12, in T14 the mediation server 10 generates a registration code "abcde" in conformance with the command "group" in the destination address "group@server.com." The mediation server 10 stores the generated registration code "abcde" in the memory 24 in association with the source address "admin2@mail.com" which is included in the group registration email.

In T16 the mediation server 10 generates a code notification email for notifying the management terminal 500 of the registration code. The code notification email includes the destination address "admin2@mail.com," the source address "complete@server.com," and a message body including the registration code "abcde." Here, the source address "complete@server.com" is constructed from the character string "complete" specifying that the registration code "abcde" has been stored, and the domain name of the mediation server 10 "server.com."

In T18 the mediation server 10 transmits the code notification email to the mail server. Since account information of the address "admin2@mail com" is stored in the mail program on the management terminal 500, the management terminal 500 can use the mail program to receive the code notification email from the mail server.

After receiving the code notification email from the mediation server 10 in T18, in T20 the management terminal 500 displays this code notification email. From this display, the user can note the registration code "abcde."

In T30 the user performs a prescribed operation on the printer 100 for adding the printer 100 to a group. In T32 the printer 100 displays a registration screen SC1 for entering a registration code. In T34 the user inputs the registration code "abcde" in an entry field provided in the registration screen SC1. In T36 the printer 100 transmits the inputted registration code "abcde" and the MAC address MA1 of the printer 100 to the mediation server 10.

When the mediation server 10 receives the registration code "abcde" and the MAC address MA1 from the printer 100 in T36, in T38 the mediation server 10 identifies the address "admin2@mail.com" stored in the memory 24 in association with the registration code "abcde." Since a group ID is not currently stored in the group table 30 in association with the address "admin2@mail.com," the mediation server 10 generates a new group ID "g02." In T40 the mediation server 10 registers in the group table 30 a record including the newly generated group ID "g02", the identified address "admin2@mail.com", and the MAC address MA1.

In T41 the mediation server 10 generates a URL notification email for notifying the user of the group URL "http://server.com/g02" that includes the group ID "g02." The group URL "http://server.com/g02" is used to access the mediation server 10 in order to register information (a record) for a print job (job ID, filename, etc.) in association with the group ID "g02." The URL notification email includes the destination address "admin2@mail.com," the source address "register@server.com," and a message body providing the group URL "http://server.com/g02." The address "register@server.com" is constructed from the character string "register" indicating that the MAC address MA1 has been registered, and the domain name of the mediation server 10 "server.com."

In T42 the mediation server 10 transmits the URL notification email to the mail server. As described in T18, the management terminal 500 can use the mail program to receive the URL notification email from the mail server.

After receiving the URL notification email from the mediation server 10 in T42, in T44 the management terminal 500 displays the URL notification email. From this display, the user of the management terminal 500 can note the group URL "http://server.com/g02."

Next, the user performs an operation on the printer 200 for adding the printer 200 to the group. In response, the printer 200 executes the same process described in T30-T34, and in T56 transmits the registration code "abcde" and the MAC address MA2 of the printer 200 to the mediation server 10.

After receiving the registration code "abcde" and the MAC address MA2 from the printer 200 in T56, in T60 the mediation server 10 identifies the address "admin2@mail.com" stored in the memory 24 in association with the registration code "abcde", and identifies the group ID "g02" stored in the group table 30 in association with the identified address "admin2@mail.com." Next, the mediation server 10 registers the MAC address MA2 in the record of the group table 30 so that the MAC address MA2 is in association with the group ID "g02" and the address "admin2@mail.com." Consequently, the two MAC addresses MA1 and MA2 are now stored in the record of the group table 30 in association with the group ID "g02."

A possible comparative example would be to provide the management terminal 500 with a prescribed screen that includes buttons for transmitting requests to the mediation server 10 requesting the mediation server 10 to generate a group ID and to register a MAC address instead of performing T10 and T12. In this case, when the mediation server 10 receives a request from the management terminal 500 in response to the user selecting a button in the prescribed screen, the mediation server 10 transmits a registration code to the management terminal 500. In contrast, the user of the management terminal 500 in the embodiment can acquire a registration code by transmitting a group registration email and receiving a code notification email. In other words, group IDs can be generated and MAC addresses can be registered without providing the management terminal 500 with a prescribed screen for requesting the mediation server 10 to generate a group ID and register a MAC address. The configuration of the comparative example described above may be employed as a variation of the embodiment.

Job Registration Process for a Group

Next, a job registration process for recording information on a print job (job ID, filename, etc.) in the job table 34 in association with a group ID will be described with reference to FIG. 3. The process in FIG. 3 is executed after the process in FIG. 2. At the time that the process begins, the records having the group IDs "g01" and "g02" have been stored in the group table 30, and the record having the individual ID "s00" has been stored in the individual table 32. In addition, the record having the job ID "j001" has been stored in the job table 34, as shown in FIG. 1.

In T100 a user wishing to print an image inputs the group URL "http://server.com/g02" into the user terminal 600.

In T102 the user terminal 600 transmits a Hypertext Transfer Protocol (HTTP) request to the mediation server 10. The HTTP request includes the group URL "http://server.com/g02" inputted in T100.

When the mediation server 10 receives the HTTP request with the group URL from the user terminal 600 in T102, in T104 the mediation server 10 transmits print settings screen data representing a print settings screen SC2 to the user terminal 600. In T104, the mediation server may transmit the group ID "g02" together with the print settings screen data. The print settings screen SC2 includes a selection field for selecting a file to be printed, and entry fields for inputting print settings (paper size, etc.).

When the user terminal 600 receives the print settings screen data from the mediation server 10 in T104, in T106 the user terminal 600 displays the print settings screen SC2. In T108 the user selects a file to be printed from among one or more files stored on the user terminal 600 (the file having filename "file2.pdf" in this example) and inputs print settings information SI2 in the entry fields of the print settings screen SC2. In T110 the user terminal 600 transmits a job registration request including the inputted information to the mediation server 10. In this case, the job registration request includes the file having filename "file2.pdf," the print settings information SI2, and the group ID "g02." The job registration request is a command for requesting the mediation server 10 to record information for the print job.

After the mediation server 10 receives the job registration request from the user terminal 600 in T110, in T112 the mediation server 10 generates a job ID "j002" and stores the file in the job registration request having the filename "file2.pdf" in the memory 24. In T114 the mediation server 10 executes a password generation process described later (see FIG. 4) to generate a password "YYY," and registers in the job table 34 a record having the password "YYY", the group ID "g02," the job ID "j002," the filename "file2.pdf" of the file provided in the job registration request, and the print settings information SI2 provided in the job registration request. In T116 the mediation server 10 transmits the password "YYY" to the user terminal 600. In the present embodiment, even if the job table 34 has already stored a certain record having the group ID "g02" and a filename different from the filename "file2.pdf" when the job registration request is received in T110, in T116 the mediation server 10 registers in the job table 34 the record which is different from the already-stored certain record and includes the password "YYY", the group ID "g02," the job ID "j002," the filename "file2.pdf". That is, in T116 the mediation server 10 does not store the filename "file2.pdf" in the certain record. In other words, in T116 the mediation server 10 does not correlate the file having filename "file2.pdf" with the file having file name registered in the already-stored certain record.

Upon receiving the password "YYY" from the mediation server 10 in T116, in T118 the user terminal 600 displays the password "YYY" so that the user can learn the password.

Password Generation Process

Next, a password generation process for generating a password will be described with reference to FIG. 4. In S10 of FIG. 4, the mediation server 10 identifies the one or more MAC addresses in the group table 30 and individual table 32 (hereinafter called "target MAC addresses") associated with the group ID or the individual ID (hereinafter called the "target ID") that was included in the job registration request received from the user terminal 600. Using the example of FIG. 3, the target ID is the group ID "g02." Thus, the mediation server 10 identifies the two MAC addresses MA1 and MA2 in the group table 30 (see FIG. 3).

In S12 the mediation server 10 determines whether there exist in the group table 30 one or more group IDs identifying a group includes one or more of the target MAC addresses. Here, in a case where the target ID is the group ID, the mediation server 10 determines whether there exist in the group table 30 one or more group IDs which are different from the target ID and identify a group includes one or more of the target MAC addresses. The mediation server 10 advances to S14 when determining that such a group ID exists (S12: YES) and skips S14 to advance directly to S16 when such a group ID does not exist (S12: NO). In the example of FIG. 3, the group ID "g01" exists in the group table 30 (see FIG. 3). The group ID "g01" identifies a group that includes the MAC address MA1, which is one of the two target MAC addresses MA1 and MA2. Accordingly, the mediation server 10 identifies the group ID "g01" and advances to S14.

In S14 the mediation server 10 identifies from the job table 34 the password associated with the group ID identified in S12. In the example of FIG. 3, the mediation server 10 identifies the password "XXX" associated with the group ID "g01" identified in S12 (see the job table 34 in FIG. 1).

In S16 the mediation server 10 determines whether the individual table 32 includes at least one or more individual IDs associated with the one or more target MAC addresses. Here, in a case where the target ID is the individual ID, the mediation server 10 determines whether the individual table 32 includes at least one or more individual IDs which is different from the target ID and associated with the one or more target MAC addresses. The mediation server 10 advances to S18 when determining that there is at least one individual ID associated with one of the target MAC addresses (S16: YES) and skips S18 to advance to S20 when determining that there are no individual IDs associated with any of the target MAC addresses (S16: NO). In the example of FIG. 3, no individual IDs in the individual table 32 are associated with any of the target MAC addresses (see the individual table 32 in FIG. 3) and, hence, the mediation server 10 advances directly to S20 without executing the process in S18.

In S18 the mediation server 10 identifies the password in the job table 34 associated with the individual ID identified in S16. In the case of FIG. 3, no password is identified in S18 because S18 is skipped.

In S19 the mediation server 10 identifies the password in the job table 34 associated with the target ID. In the case of FIG. 3, the target ID is the group ID "g02" and the job table 34 does not store a password associated with this ID (see FIG. 1). Accordingly, the mediation server 10 does not identify a password.

In S20 the mediation server 10 generates a password that does not match any of the passwords identified in S14, S18, and S19. In the case of FIG. 3, the mediation server 10 identified the password "XXX" in S14, skipped S18, and identified no passwords in S19. Accordingly, in S20 the mediation server 10 generates the password "YYY" that does not match the identified password "XXX." That is, the mediation server 10 generates a password different from the password "XXX." After completing step S20, the process of FIG. 4 ends.

As in the example of the group table 30 in FIG. 3, the MAC address MA1 of the printer 100 can be associated with two group IDs "g01" and "g02." In this case, if the same password were associated with both group IDs, there is potential for print data obtained using a file stored in association with one of the group IDs being transmitted to a printer included in the group identified by the other group ID. Further, it is desirable to use shorter passwords because the users must input the passwords themselves. As the password is shorter, the risk of such errors is increased. Executing the process in FIG. 4 can prevent such errors from occurring.

Further, the MAC address MA1 of the printer 100 may be associated with an individual ID (such as the ID "s01" described later) in addition to being associated with the group ID "g01." Executing the process in FIG. 4 can prevent the same password from being associated with both the group ID "g01" and the individual ID "s01."

Job Registration Process for an Individual Printer

Figure 5:
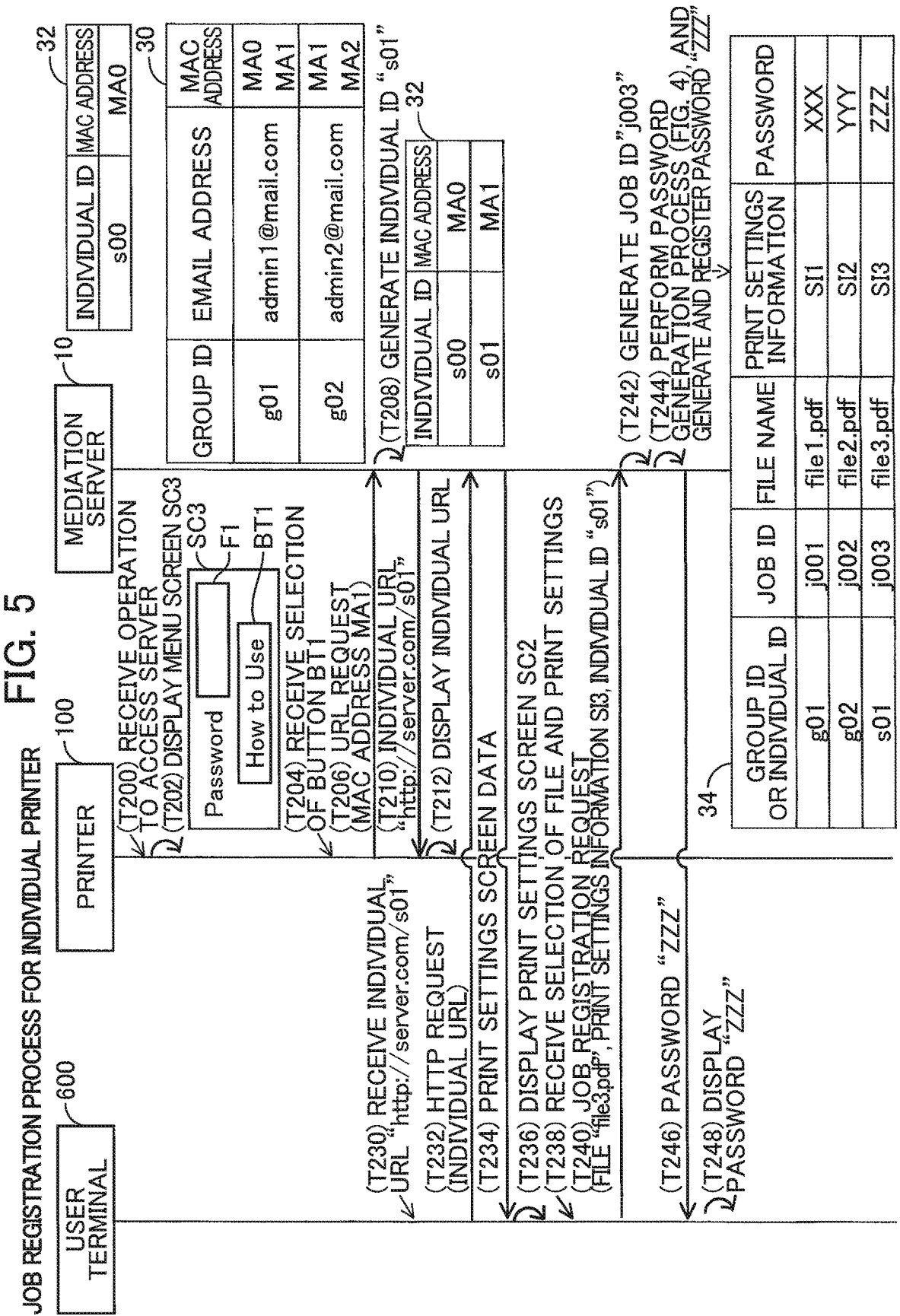
FIG. 5 is a sequence diagram illustrating a job registration process for an individual printer according to the first embodiment.

Next, a job registration process for registering in the job table 34 a record for a print job which associates a job ID, a filename, and etc. with an individual ID will be described with reference to FIG. 5. The process of FIG. 5 is executed following the process of FIG. 3. At the time this process begins, the records including the group IDs "g01" and "g02" have been stored in the group table 30, and the individual ID "s00" has been stored in the individual table 32. In addition, the record including the job IDs "j001" and "j002" have been stored in the job table 34, as illustrated in FIG. 3.

In T200 of FIG. 5, the user performs an operation on the printer 100 to access the mediation server 10. In response to this operation, in T202 the printer 100 displays a menu screen SC3. The menu screen SC3 includes a password entry field F1 for inputting a password, and a How to Use button BT1.

In T204 the user selects the How to Use button BT1 in the menu screen SC3. In this case, in T206 the printer 100 transmits a URL request to the mediation server 10 that includes the MAC address MA1 of the printer 100. The URL request is a command for requesting an individual URL including an individual ID.

When the mediation server 10 receives the URL request from the printer 100 in T206, in T208 the mediation server 10 generates an individual ID "s01" and registers in the individual table 32 a record including the individual ID "s01", and the MAC address MA1 included in the URL request. If the record having the MAC address MA1 and the individual ID "s01" is already stored in the individual table 32 at this time, the mediation server 10 uses the individual table 32 to identify the individual ID "s01" correlated with the MAC address MA1 included in the URL request. In this case, the identified individual ID "s01" is used in the subsequent step T210.

In T210 the mediation server 10 transmits an individual URL "http://server.com/s01" that includes the generated individual ID "s01" to the printer 100. The individual URL "http://server.com/s01" is used to access the mediation server 10 in order to register a record for a print job which associates a job ID, a filename, and etc. with the individual ID "s01." Upon receiving this individual URL, in T212 the printer 100 displays the individual URL "http://server.com/s01." In T212 the printer 100 may display a message for prompting a user to access the mediation server 10 using the individual URL "http://server.com/s01" for registering a print job.

Step T230 is identical to step T100 of FIG. 3, except that in T230 the user inputs the individual URL "http://server-.com/s01." Step T232 is identical to step T102 of FIG. 3, except that in T232 the HTTP request includes the individual URL "http://server.com/s01." Steps T234-T238 are identical to steps T104-T108 in FIG. 3, except that in T234-T238 the user selects a file having file name "file3.pdf" and inputs print settings information SI3. In T240 the user terminal 600 transmits a job registration request to the mediation server 10 that includes the file having filename "file3.pdf," the print settings information SI3, and the individual ID "s01."

Figure 4:
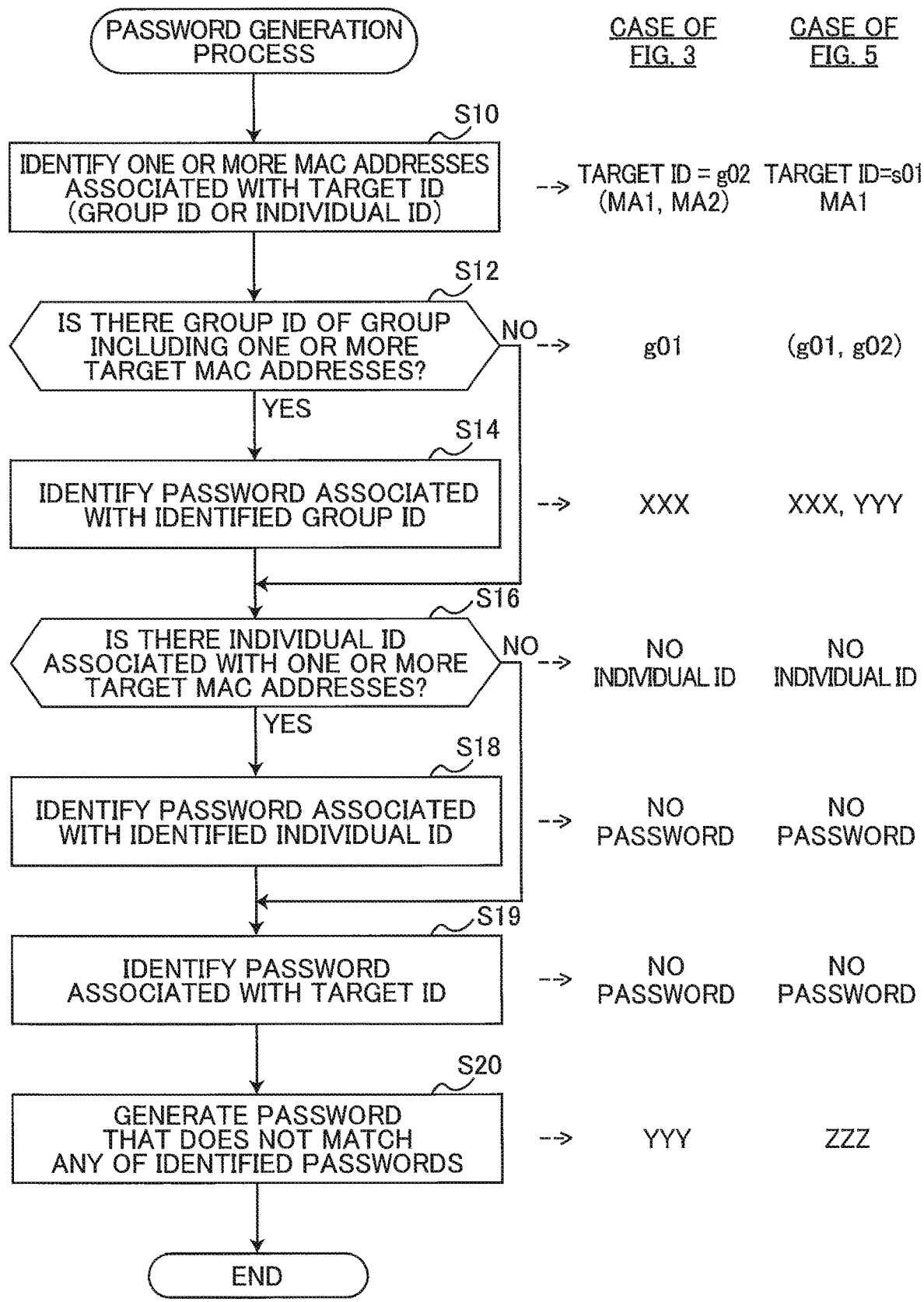
FIG. 4 is a flowchart illustrating a password generation process according to the first embodiment.

When the mediation server 10 receives the job registration request from the user terminal 600 in T240, in T242 the mediation server 10 generates a job ID "j003." In T244 the mediation server 10 executes the password generation process described in FIG. 4 to generate a password "ZZZ". Subsequently, the mediation server 10 registers in the job table 34 a record including the generated password "ZZZ", the individual ID "s01," the generated job ID "j003," the filename "file3.pdf" for the file included in the job registration request, and the print settings information SI3 included in the job registration request. Step T246 is identical to step T116 of FIG. 3, except that in T246 the mediation server 10 transmits the password "ZZZ." Step T248 is identical to step T118 of FIG. 3, except that in T248 the user terminal 600 displays the password "ZZZ."

Here, the process of generating the password "ZZZ" will be described in greater detail with reference to FIG. 4. In this case, the target ID is the individual ID "s01." Accordingly, in S10 of FIG. 4 the mediation server 10 identifies the MAC address MA1 as the target MAC address from the individual table 32. In S12 the mediation server 10 identifies the two group IDs "g01" and "g02" since both group IDs identify groups that include the target MAC address MA1 in the group table 30 shown in FIG. 5. In S14 the mediation server 10 identifies the password "XXX" associated with the group ID "g01" and the password "YYY" associated with the group ID "g02" in the job table 34 shown in FIG. 3. Since the target ID is the individual ID "s01" in this case, the mediation server 10 does not identify another individual ID in S16 and, thus, skips S18. In S19 the mediation server 10 does not identify a password because no password is associated with the individual ID "s01" (i.e., the target ID) in the job table 34 shown in FIG. 3. Hence, since the mediation server 10 identified the passwords "XXX" and "YYY" in S14, skipped S18, and identified no password in S19, in S20 the mediation server 10 generates a password "ZZZ" that does not match either of the identified passwords "XXX" or "YYY."

Printing Process for a Group

Figure 6:
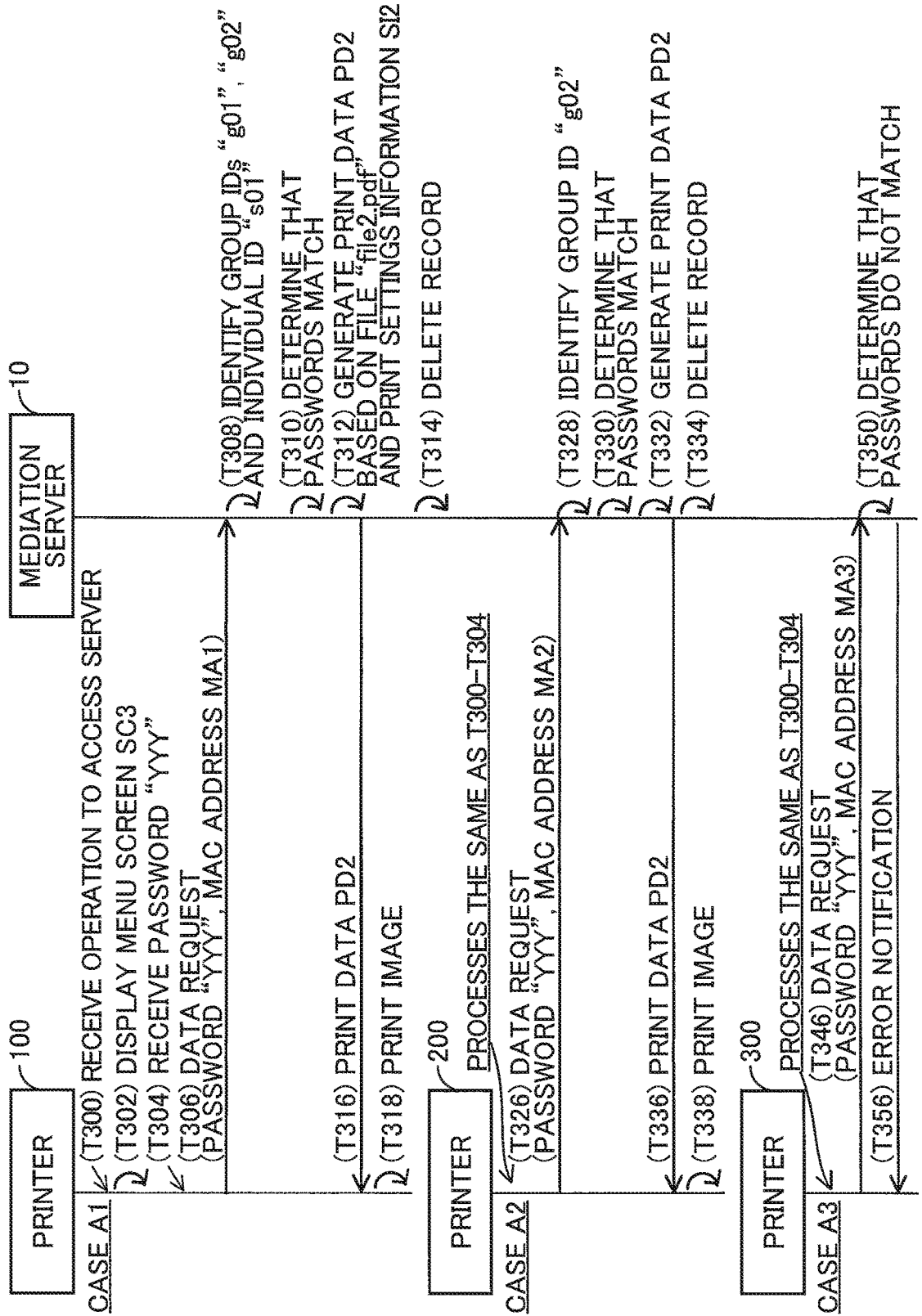
FIG. 6 is a sequence diagram illustrating a printing process for the group according to the first embodiment.

Next, various examples of printing processes will be described with reference to FIG. 6 for executing printing operations using the password "YYY" associated with the group ID "g02." FIG. 6 shows three Cases A1, A2, and A3. Each process of Cases A1-A3 is executed following the process of FIG. 5.

Case A1 for Inputting the Password "YYY" into the Printer 100

Steps T300 and T302 are identical to steps T200 and T202 of FIG. 5. In T304 the user inputs the password "YYY" into the password entry field F1 provided in the menu screen SC3. In this case, in T306 the printer 100 transmits a data request to the mediation server 10 that includes the inputted password "YYY" and the MAC address MA1 of the printer 100. The data request is a command for requesting print data.

When the mediation server 10 receives the data request from the printer 100 in T306, in T308 the mediation server 10 identifies the group ID and the individual ID in the group table 30 and the individual table 32 associated with the MAC address MA1 in the data request. In this case, the mediation server 10 identifies group IDs "g01" and "g02" from the group table 30 (see FIG. 5) and identifies the individual ID "s01" in the individual table 32 (see FIG. 5).

In T310 the mediation server 10 identifies the three passwords "XXX," "YYY," and "ZZZ" in the job table 34 associated with the group IDs "g01" and "g02" and the individual ID "s01" identified in T308, and determines that the password "YYY" associated with the group ID "g02" among the identified passwords matches the password "YYY" included in the data request. In this case, in T312 the mediation server 10 identifies the various data in the job table 34 associated with the password "YYY" (i.e., the job ID "j002," the filename "file2.pdf," and the print settings information SI2). Next, the mediation server 10 converts the file having filename "file2.pdf" according to the print settings specified in the identified print settings information SI2 to generate print data PD2 having a data format that the printer 100 can interpret.

In T316 the mediation server 10 transmits the generated print data PD2 to the printer 100. As a result, in T318 the printer 100 prints an image represented by the print data PD2 (i.e., an image represented by the file having filename "file2.pdf").

In addition, after transmitting the print data PD2 to the printer 100, in T314 the mediation server 10 deletes the record having the job ID "j002" from the job table 34. Subsequently, the mediation server 10 deletes the file having filename "file2.pdf" from the memory 24.

Case A2 for Inputting the Password "YYY" into the Printer 200

In Case A2 the password "YYY" is inputted into the printer 200 by executing the same process in T300-T304 in Case A1 described above. Step T326 is identical to step T306 of Case A1, except that in T326 the data request includes the MAC address MA2 of the printer 200. Step T328 is identical to step T308, except that in T328 the mediation server 10 identifies the group ID "g02" associated with the MAC address MA2 included in the data request. Steps T330-T338 are identical to steps T310-T318 described above.

Case A3 for Inputting the Password "YYY" into the Printer 300

In Case A3 the password "YYY" is inputted into the printer 300 by executing the same process in T300-T304 described above. Step T346 is identical to step T306 of Case A1, except that in T346 the data request includes the MAC address MA3 of the printer 300. In this case, since there are no group IDs or individual IDs associated with the MAC address MA3 in the data request, in T350 the mediation server 10 determines that a password matching the password "YYY" in the data request does not exist. Hence, in T356 the mediation server 10 transmits an error notification to the printer 300 indicated that a password matching the password "YYY" does not exist.

In Cases A1-A3 described above, the group ID "g02" is stored in the group table 30 in association with the two MAC addresses MA1 and MA2 (see FIG. 5). When the mediation server 10 receives the group ID "g02" and a file having filename "file2.pdf" from the user terminal 600 (T110 of FIG. 3), the mediation server 10 transmits the password "YYY" associated with the group ID "g02" and the filename "file2.pdf" to the user terminal 600 (T116 of FIG. 3). If the mediation server 10 receives the MAC address MA1 (or MA2) and the password "YYY" from the printer 100 (or 200) included in the group identified by the group ID "g02," as in Cases A1 and A2 (T306 or T326 of FIG. 6), the mediation server 10 transmits the print data PD2 to the printer 100 (or 200) (T316 or T336). That is, the mediation server 10 can transmit the print data PD2 to either of the printers 100 and 200 included in the group identified by the group ID "g02." Further, if the mediation server 10 receives the MAC address MA3 and the password "YYY" from the printer 300 not included in the group identified by the group ID "g02," as in Case A3 (T346), the mediation server 10 does not transmit the print data PD2 to the printer 300 (T356). Hence, the method of the mediation server 10 avoids transmitting the print data PD2 to the printer 300 that does not belong in the group.

Printing Process for an Individual Printer

Figure 7:
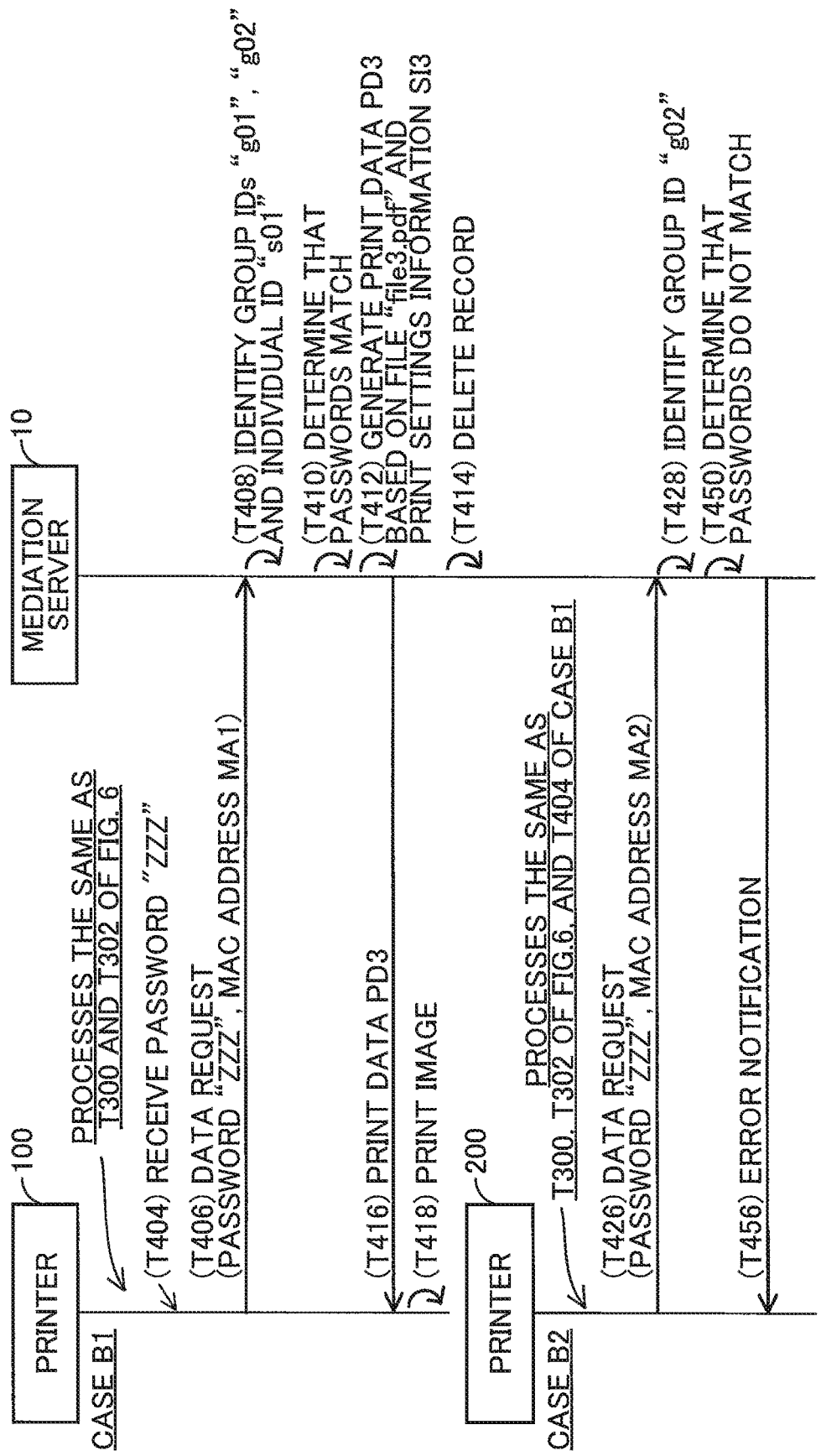
FIG. 7 is a sequence diagram illustrating a printing process for the individual printer according to the first embodiment.

Next, various cases of printing processes for executing printing operations using the password "ZZZ" associated with the individual ID "s01" will be described with reference to FIG. 7. FIG. 7 shows two Cases B1 and B2. Each process of Cases B1 and B2 is executed following the process of FIG. 5.

Case B1 for Inputting the Password "ZZZ" into the Printer 100

In the beginning of Case B1 of the printing process, the same process in T300 and T302 of FIG. 6 is executed on the printer 100. In T404 the user inputs the password "ZZZ" into the password entry field F1 provided in the menu screen SC3. Step T406 is identical to step T306 of FIG. 6, except that in T406 the data request includes the password "ZZZ." Step T408 is identical to step T308 of FIG. 6. Step T410 is identical to step T310 of FIG. 6, except that in T410 the password "ZZZ" in the data request matches only the password "ZZZ" associated with the individual ID "s01" from among the three identified passwords "XXX," "YYY," and "ZZZ." Step T412 is identical to step T312 of FIG. 6, except that in T412 the mediation server 10 identifies information associated with the password "ZZZ" (i.e., the job ID "j003," the filename "file3.pdf," and the print settings information SI3) and generates print data PD3 by converting the file having filename "file3.pdf" according to the print settings specified by the identified print settings information SI3. Steps T416 and T418 are identical to steps T316 and T318 of FIG. 6, except that in T416 and T418 the print data PD3 is used. Step T414 is identical to step T314 of FIG. 6, except that in T414 a record having the job ID "j003" and the file having filename "file3.pdf" are deleted.

Case B2 for Inputting the Password "ZZZ" into the Printer 200

In Case B2 of the printing process, the password "ZZZ" is inputted into the printer 200 by executing the same process described in T300, T302 of FIG. 6, and T404 of Case B1 (FIG. 7). Step T426 is identical to step T406 of Case B1, except that the data request includes the MAC address MA2 of the printer 200. Step T428 is identical to step T328 of FIG. 6. In step T450 the mediation server 10 identifies the password "YYY" in the job table 34 associated with the identified group ID "g02" and determines that the identified password "YYY" does not match the password "ZZZ" included in the data request. In this case, in T456 the mediation server 10 transmits an error notification to the printer 200 but does not transmit print data.

In Cases B1 and B2 described above, the individual ID "s01" is stored in the individual table 32 in association with the MAC address MA1 (see FIG. 5). Thus, when the mediation server 10 receives the individual ID "s01" and a file having filename "file3.pdf" from the user terminal 600 (T240 of FIG. 5), the mediation server 10 transmits the password "ZZZ" associated with the individual ID "s01" and the filename "file3.pdf" to the user terminal 600 (T246). If the mediation server 10 receives the MAC address MA1 and the password "ZZZ" from the printer 100 identified by the individual ID "s01," as in Case B1 (T406 of FIG. 7), the mediation server 10 transmits the print data PD3 to the printer 100 (T416). However, if the mediation server 10 receives the MAC address MA2 and the password "ZZZ" from the printer 200 which are not identified by the individual ID "s01," as in Case B2 (T426), the mediation server 10 does not transmit the print data PD3 to the printer 200 (T456). Hence, the mediation server 10 can transmit the print data PD3 only to the printer 100 identified by the individual ID "s01" and can be prevented from transmitting the print data PD3 to printers other than the printer 100 (the printer 200, for example).

Here, the processes performed by the mediation server 10 from receiving a file to transmitting print data will be compared for the case of a group and the case of an individual printer. As illustrated in FIGS. 3 and 5 through 7, regardless of whether printing is executed by using a group or an individual printer, the mediation server 10 receives an ID (i.e., a group ID or an individual ID) and a file from the user terminal 600 (T110 of FIG. 3 or T240 of FIG. 5) and transmits a password to the user terminal 600 (T116 of FIG. 3 or T246 of FIG. 5) when a URL (i.e., a group URL or an individual URL) including an ID (i.e., the group ID or individual ID) is inputted into the user terminal 600. When a password is subsequently inputted into the printer 100, the mediation server 10 receives the MAC address MA1 and the password from the printer 100 (T306 of FIG. 6 or T406 of FIG. 7) and transmits print data (PD2 or PD3) to the printer 100 (T316 of FIG. 6 or T416 of FIG. 7). Hence, regardless of whether the ID is a group ID or an individual ID, the user executes common operations that include inputting a URL that contains an ID (T100 of FIG. 3 or T230 of FIG. 5) and inputting a password (T304 of FIG. 6 or T404 of FIG. 7), thereby enhancing user-friendliness.

Correspondences

The mediation server 10, the network interface 12, and the memory are examples of a server, a communication interface, and a memory 24 respectively. The user terminal 600 is an example of a terminal device and an external apparatus. The printers 100 and 200 are examples of at least two communication apparatuses. The MAC addresses MA1 and MA2 are examples of at least two sets of device information. The printer 100 or 200 and the MAC addresses MA1 or MA2 are respectively examples of a first communication apparatus and first device information. The group ID "g02", the password "YYY" are examples of first group identification information and first authentication information, respectively. The file having filename "file2.pdf" and the print data PD2 are examples of a first file and a second file, respectively. The group ID "g01", and the password "XXX" are examples of second group identification information and second authentication information respectively. The single ID "s01 and the password "ZZZ" are examples of individual identification information and third authentication information. The file having filename "file3.pdf" and the print data PD3 are examples of a third file and a fourth file. The management terminal 400, the group registration email, the registration code "abcde" are examples of a management apparatus, a registration request, and a code mail, respectively. The group registration email and the code notification email are example of a first email and a second email respectively. The processes of T110, T114, and T116 in FIG. 3 and the process of T316 or T336 are examples of a step of receiving first group identification information and first file, a step of storing authentication information, first group identification information, the first file, a step of transmitting first authentication information, and a step of transmitting second file, respectively.

Second Embodiment

Group Registration Process

In the second embodiment, the group table 30 stores a storage date and time indicating when a MAC address was stored in the group table 30 for each of the one or more MAC addresses included in the list of MAC addresses. For example, the storage date and time "8:00" is stored in the group table 30 in association with the MAC address MA1 to indicate the time that the MAC address MA1 was registered in the record having the group ID "g02." Note that since the date is common for all storage date and times in the second embodiment, the date is omitted in the storage date and times in the following explanation and FIGS. 8 and 9 and only the time is given.

A storage date and time is also registered in a record of the job table 34 to indicate when the record including the job ID and password were registered. As an example, the storage date and time "9:50" is stored in the record of the job table 34 having the group ID "g02," the job ID "j002," and the password "YYY."

Figure 8:
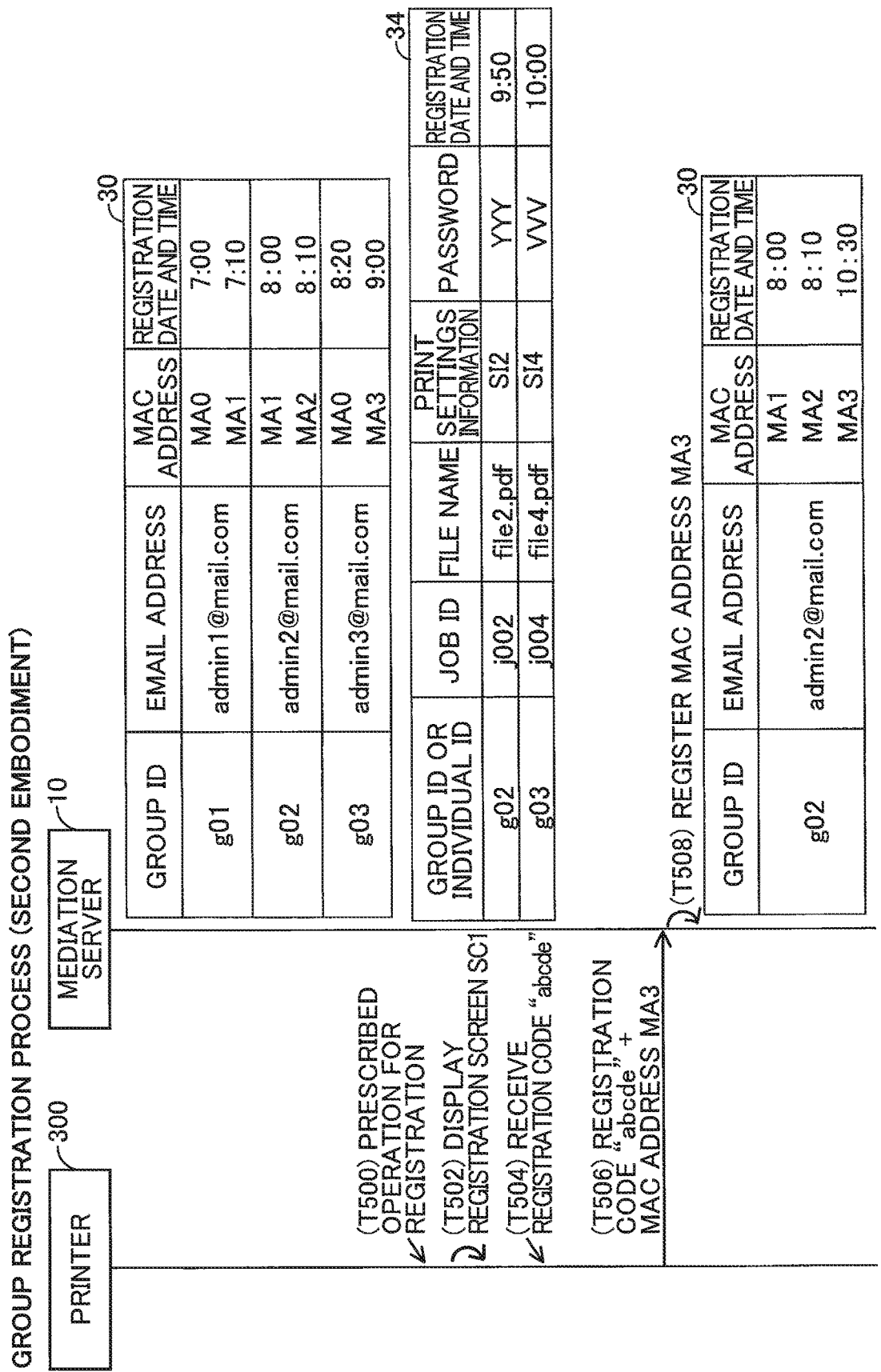
FIG. 8 is a sequence diagram illustrating a group registration process according to a second embodiment.

Here, FIG. 8 shows a case in which the MAC address MA3 of the printer 300 is stored in the group table 30 in association with the group ID "g02" after the job ID "j002" and other information is stored in the job table 34 in association with the group ID "g02." Specifically, the printer 300 executes steps T500-T504, which are identical to steps T30-T34 of FIG. 2, and in T506 transmits the registration code "abcde," and the MAC address MA3 of the printer 300 to the mediation server 10. In response, in S508 the mediation server 10 stores the MAC address MA3 and the storage date and time "10:30" in the group table 30 in association with the group ID "g02."

Printing Process

Figure 9:
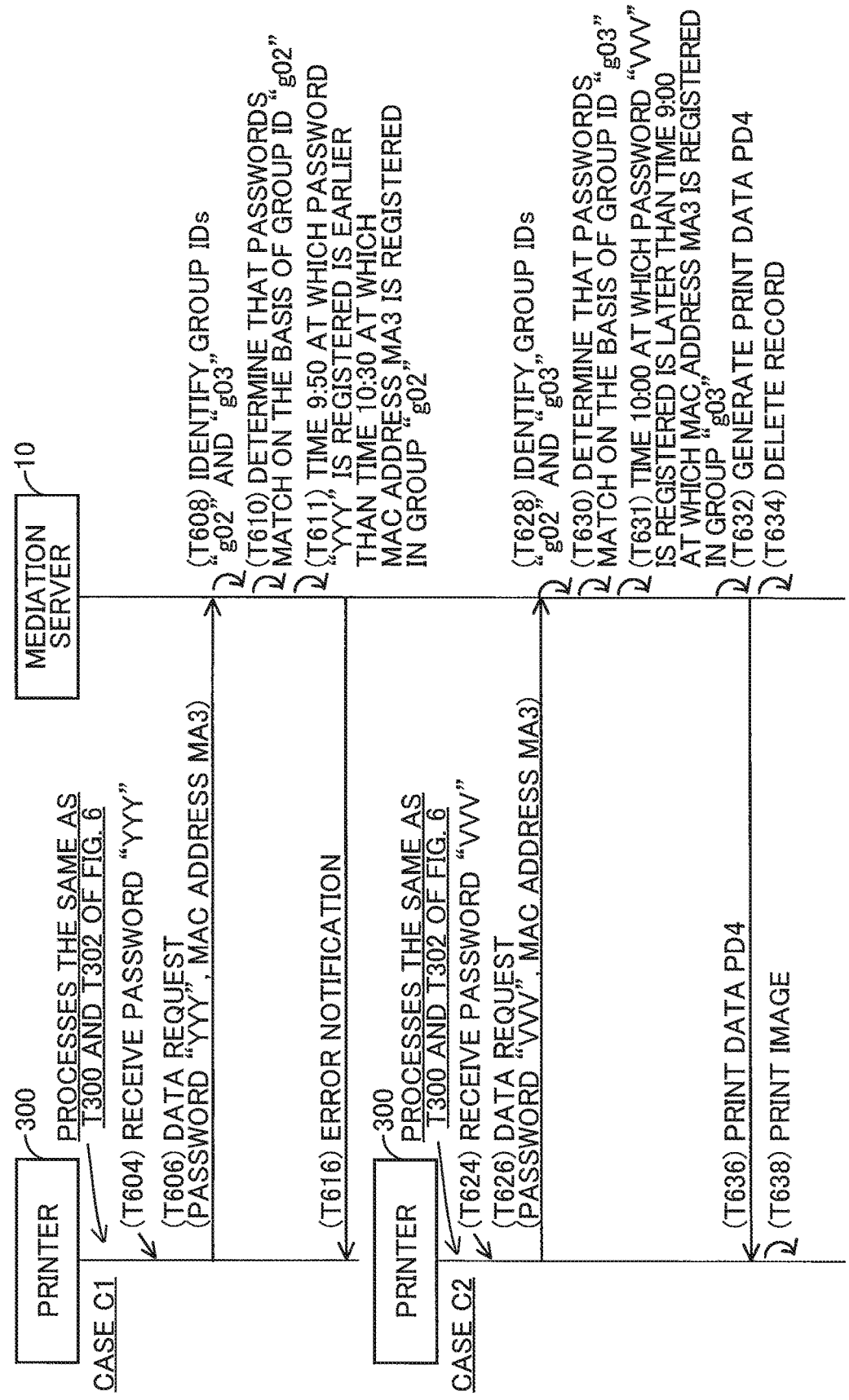
FIG. 9 is a sequence diagram illustrating a printing process according to the second embodiment.

Next, various cases of a printing process will be described with reference to FIG. 9. FIG. 9 shows two Cases C1 and C2. Each process of Cases C1 and C2 is executed following the process of FIG. 8.

Case C1 for Inputting the Password "YYY" into the Printer 300

At the beginning of Case C1, the same process described in T300 and T302 of FIG. 6 is executed on the printer 300. In T604 the user inputs the password "YYY" into the printer 300. Step T606 is identical to step T306 of FIG. 6, except that in T606 the data request includes the MAC address MA3 of the printer 300. In T608 the mediation server 10 identifies group IDs "g02" and "g03" in the group table 30 on the basis of the MAC address MA3 (see FIG. 8). In T610 the mediation server 10 identifies two passwords "YYY" and "VVV" in the job table 34 that are associated with the group IDs "g02" and "g03" identified in T608, and determines that the password "YYY" associated with the group ID "g02" among the two identified passwords matches the password "YYY" included in the data request.

In T611 the mediation server 10 identifies the storage date and time "9:50" in the job table 34 associated with the password "YYY" and identifies the storage date and time "10:30" in the group table 30 associated with both the group ID "g02" and the MAC address MA3. By comparing the two storage date and times "9:50" and "10:30," the mediation server 10 determines that the time "9:50" at which the password "YYY" was stored in the job table 34 in association with the group ID "g02" is earlier than the time "10:30"

at which the MAC address MA3 was stored in the group table 30 in association with the group ID "g02." In this case, in T616 the mediation server 10 transmits an error notification to the printer 300, and does not transmit print data to the printer 300.

Case C2 for Inputting the Password "VVV" into the Printer 300

In Case C2, the same process described in T300 and T302 of FIG. 6 is first executed. Step T624 is identical to step T604 of Case C1, except that in T624 the user inputs the password "VVV." Step T626 is identical to step T606, except that in T626 the data request includes this password "VVV." Step T628 is identical to step T608. Step T630 is identical to step T610, except that in T630 the mediation server 10 determines that the password "VVV" associated with the group ID "g03" matches the password "VVV" in the data request.

In T631 the mediation server 10 identifies the storage date and time "10:00" in the job table 34 associated with the password "VVV" and identifies the storage date and time "9:00" in the group table 30 associated with both the group ID "g03" and the MAC address MA3. By comparing the two storage date and times "10:00" and "9:00," the mediation server 10 determines that the time "10:00" at which the password "VVV" was stored in the job table 34 in association with the group ID "g03" is later than the time "9:00" at which the MAC address MA3 was stored in the group table 30 in association with the group ID "g03." In this case, the mediation server 10 executes the process in T632-T636. Step T632 is identical to step T312 of FIG. 6, except that in T632 the mediation server 10 uses information correlated with the password "VVV" (i.e., a job ID "j004," a filename "file4.pdf," and print settings information SI4) to generate print data PD4 based on the file having the filename "file4.pdf". Step T634 is identical to step T314 of FIG. 6, except that in T634 the mediation server 10 deletes the record having the job ID "j004" from the job table 34 and deletes the file having filename "file4.pdf." Steps T636 and T638 are identical to steps T316 and T318 of FIG. 6, except that in T636 and T638 the print data PD4 is used.

According to Case C1 described above, after the password "YYY" was stored in the job table 34 in association with the group ID "g02", the MAC address MA3 of the printer 300 was stored in the group table 30 in association with the group ID "g02". Subsequently, the mediation server 10 receives the password "YYY" from the printer 300 (T606). In this case, the mediation server 10 does not transmit the print data PD4 to the printer 300 (T616). As illustrated in an initial state of the group table 30 in FIG. 8, the MAC addresses MA1 and MA2 correlated with the group ID "g02" are not associated with the group ID "g03." Therefore, when generating the password "VVV" to be associated with the group ID "g03" in the password generation process of FIG. 4, the mediation server 10 did not consider whether the password "VVV" matches the password "YYY" associated with the group ID "g02." In such a case, a password "YYY" matching the password "YYY" associated with the group ID "g02" could be stored in association with the group ID "g03" instead of the password "VVV." If the password "YYY" were stored in association with the group ID "g03," the mediation server 10 would determine that the password "YYY" received from the printer 300 matches two passwords "YYY" stored in the job table 34. Consequently, the mediation server 10 may transmit not only the print data PD4 corresponding to the group ID "g03," but also the print data PD2 corresponding to the group ID "g02" to the printer 300. However, there is a high probability that the user does not intend to use the printer 300 to print an image represented by the file with filename "file2.pdf" because this filename was stored in the job table 34 in association with the group ID "g02" prior to the MAC address MA3 of the printer 300 being stored in the group table 30 in association with the group ID "g02." By executing the determinations in T611 and T631 of the second embodiment, the mediation server 10 can prevent the print data PD2 (print data generated from the file with filename "file2.pdf") from being transmitted to the printer 300 against the intentions of the user. Here, the printer 300 is an example of the "second communication apparatus," and the MAC address MA3 is an example of the "second device information."

While the disclosure has been described in detail with reference to the above embodiments, it would be apparent to those skilled in the art that various changes and modifications may be made thereto.

First Variation

In the embodiments, the group table 30 is stored in the memory 24 provided in the mediation server 10. However, the group table 30 may be stored on a server separate from the mediation server 10. In this variation, the system including the mediation server 10 and the separate server from the mediation server 10 is an example of the "server," and the separate server is an example of the "memory."

Second Variation

In the embodiments, the group table 30 stores two or more MAC addresses. However, the group table 30 may store two or more serial numbers assigned to two or more printers. In this variation, the two or more serial numbers are an example of the "information on two or more devices."

Third Variation

In the embodiments, the mediation server 10 receives the file having filename "file2.pdf" and the print settings information SI2 from the user terminal 600 (T110 of FIG. 3). However, instead of receiving the file "file2.pdf", the mediation server 10 may receive from the user terminal 600 device settings information for setting items (wireless LAN settings, for example) of the printer 100. Further, the mediation server 10 may store the device settings information in the job table 34 in association with the password "YYY." In this case, the mediation server 10 may transmit the device settings information associated with the password "YYY" to the printer 100 when receiving the password "YYY" and the MAC address MA1 from the printer 100. In this way, the printer 100 may modify values for the setting items according to the device settings information received from the mediation server 10. In this variation, the device settings information is an example of the "first and second files."

Fourth Variation

In the embodiments, the mediation server 10 transmits the password "YYY" to the user terminal 600 (T116 of FIG. 3). However, the mediation server 10 may transmit email that includes the password "YYY" in the message body to the mail server. In this variation, the mail server is an example of the "external device."

Fifth Variation

In the embodiments, the mediation server 10 transmits the print data PD2 generated from a file having filename "file2.pdf" to the printer 100 (T316 of FIG. 6). However, the mediation server 10 may transmit the file having filename "file2.pdf" and the print settings information SI2 to the printer 100. In this case, the printer 100 prints an image on the basis of the file having filename "file2.pdf" according to the print settings information SI2. In this variation, the file having filename "file2.pdf" is an example of the "first and second files."

Sixth Variation

In the embodiments, the mediation server 10 generates a password that does not match either the password identified in S14 or S18 of FIG. 4 or the password corresponding to the target ID (S20 of FIG. 4). However, the mediation server 10 may generate a password that does not match any password among all passwords that the mediation server 10 can currently use, rather than simply generating a password that does not match the specific passwords described above. Further, as another example, a plurality of passwords may be pre-stored in the memory 24 of the mediation server 10. Here, the mediation server 10 may select one of the passwords from the memory 24 that does not match any of the above mentioned passwords. In other words, the mediation server 10 need not generate a password.

Seventh Variation

In the embodiments, the mediation server 10 receives group registration email from the management terminal 500 (T12 of FIG. 2). However, the mediation server 10 may receive a request from the management terminal 500 to register a MAC address when the user selects a prescribed button in the prescribed screen displayed on the management terminal 500. In this variation, the request described above is an example of the "registration request."

Eighth Variation

Step S12 may be omitted from FIG. 4. In this variation, the "step of determining whether the memory stores second identification information" may be omitted.

Ninth Variation

Step S16 may be omitted from FIG. 4. In this variation, the "second determination unit" may be omitted.

Tenth Variation

The mediation server 10 need not store the individual table 32. In such a case, the processes of FIGS. 5 and 7 may be omitted. In this variation, the "receiving third file step," "storing first individual identification information step," "transmitting third authentication information step," and "transmitting fourth file step" may be omitted.

Eleventh Variation

In the embodiments, the mediation server 10 transmits the registration code "abcde" to the management terminal 500 after receiving a group registration email. The mediation server 10 stores the group ID "g02" and MAC addresses MA1 and MA2 in the group table 30 after receiving the registration code "abcde" from each of the printers 100 and 200 (T40 and T60 of FIG. 2). However, the mediation server 10 may store the group ID "g02" and MAC addresses MA1 and MA2 in the group table 30 when the MAC addresses MA1 and MA2 are inputted into the mediation server 10. In this variation, the "receiving registration request step," "storing code step," "transmitting code step," "receiving code step," and "stop of storing first group identification information, first device information, and second device information" may be omitted.

Twelfth Variation

Step T314 of FIG. 6 may be omitted. In this variation, the "deleting step" may be omitted. In this case, the processes of Case A2 may be performed after the processes of Case A1 are performed.

Thirteenth Variation

The "communication apparatus" need not be a printer, but may be a scanner or a multifunction peripheral, for example. In the example of a scanner, the mediation server 10 may receive information, such as a list of destinations for scan data (email addresses, for example), as the information to be transmitted from the user terminal 600 to the scanner. In this variation, the list of information specifying destinations for scan data is an example of the "first and second files."

Fourteenth Variation

In the embodiments, an individual password is stored in the job table 34 in association with an individual filename. However, one password may be stored in association with two or more filenames in the job table 34. For example, if the job table 34 has already stored a certain record having the group ID "g02" and a filename different from the filename "file2.pdf" when the job registration request is received in T110 (FIG. 3), in T116 the mediation server 10 registers in the job table 34 the already-stored certain record the filename "file2.pdf". Accordingly, in the certain record, the filename "file2.pdf" and the different filename are correlated in one password. Further, when the mediation server 10 receives a data request including a password from the printer 100 (T306 of FIG. 6), the mediation server 10 may transmit the two or more filenames stored in association with the password to the printer 100. When the mediation server 10 subsequently receives one of the two or more filenames from the printer 100, the mediation server 10 may transmit print data generated from the file having the received filename to the printer 100.

Fifteenth Variation

In the embodiments, each process or step shown in FIGS. 2-9 is performed by the CPU 22 of the mediation server 10 executing the program 26 (e.g., the software). However, any process or step may be performed by hardware such as a logic circuit.

What is claimed is:

1. A server comprising:
   a communication interface configured to communicate with a terminal device;
   a memory storing first correlation information for correlating first group identification information with both first device information and second device information, the first group identification information being for identifying a first group, the first device information being assigned to a first communication device, the second device information being assigned to a second communication device, the first correlation information indicating that the first group includes the first communication device and the second communication device; and
   a processor configured to perform:
      receiving the first group identification information and a first file from the terminal device;
      in a first case where the first group identification information and the first file are received from the terminal device:
         storing in the memory the first file and first authentication information to correlate both the first file and the first authentication information with the first group identification information; and
         transmitting the first authentication information to an external apparatus via the communication interface;
      in a second case where device information matching the first device information correlated with the first group identification information and authentication information matching the first authentication information are received from the first communication device via the communication interface after the transmitting the first authentication information is performed, transmitting to the first communication device a second file generated using the first file which is stored correlated with the first authentication information in the memory; and in a third case where device information matching the second device information correlated with the first group identification information and authentication information matching the first authentication information are received from the second communication device via the communication interface after the transmitting the first authentication information is performed, transmitting to the second communication device the second file.

2. The server according to claim 1, wherein the processor is configured to further perform, in the first case, determining whether the memory has stored second group identification information for identifying a second group including at least one of the first communication device and the second communication device which are included in the first group, wherein in a case where the memory has stored the second group identification information correlated with second authentication information, the transmitting transmits the first authentication information different from the second authentication information.

3. The server according to claim 1, wherein the processor is configured to further perform:

in a case where the memory has stored second correlation information for correlating individual identification information with the first device information, the individual identification information being for identifying only the first communication device, receiving identification information matching the individual identification information and a third file from the terminal device via the communication interface;

in a case where identification information matching the individual identification information and the third file are received from the terminal device:

storing in the memory the third file and third authentication information to correlate both the third file and the third authentication information with the individual identification information; and transmitting the third authentication information to the external apparatus via the communication interface; and in a case where device information matching the first device information, authentication information matching the third authentication information are received from the first communication device after the transmitting the third authentication information is performed, transmitting to the first communication device a fourth file generated using the third file which is stored correlated with the third authentication information in the memory.

4. The server according to claim 3, wherein the processor is configured to further perform, in the first case, determining whether the memory has stored the individual identification information, wherein in a case where the memory has stored the individual identification information, the transmitting the first authentication information transmits the first authentication information different from the third authentication information which is stored correlated with the individual identification information in the memory.

5. The server according to claim 1, wherein the processor is configured to further perform:

receiving from a management apparatus via the communication interface a registration request for registering correlation information for correlating a plurality of sets of device information with the first group identification information;

in a case where the registration request is received from the management apparatus:

storing a code in the memory; and transmitting the code to the management apparatus via the communication interface;

after transmitting the code to the management apparatus, receiving the code and the first device information from the first communication device and receiving the code and the second device information from the second communication device via the communication interface;

in a case where device information matching the first device information and the code are received from the first communication device, and device information matching the second device information and the code are received from the second communication device, storing the first correlation information in the memory.

6. The server according to claim 5, wherein the registration request is a first email transmitted from the management apparatus, the first email including an email address specifying a transmission source of the first email, the email address being registered in the management apparatus, wherein the transmitting the code includes transmitting a second email having the code to a destination which is designated by the email address included in the first email.

7. The server according to claim 1, wherein the processor is configured to further perform after the first file and the first authentication information are stored correlated with the first group identification information in the memory, storing in the memory the third device information to be correlated with the first group identification information, the third device information being assigned to a third communication device different from both the first communication device and the second communication device, wherein in a case where device information matching the third device information and authentication information matching the first authentication information are received from the third device after the third device information is stored correlated with the first group identification information in the memory, the processor does not transmit the second file to the third communication device.

8. The server according to claim 1, wherein the processor is configured to further perform deleting the first file from the memory after the second file is transmitted to the first communication device.

9. The server according to claim 1, wherein each of the first communication device and the second communication device is a printer configured to perform printing, wherein each of the first file and the second file represents an image to be printed.

10. The server according to claim 1, wherein in the first case, if the first group identification information is correlated with another file different from the first file, the storing the first file and the first authentication information is performed without correlating the first file with the another file.

11. A non-transitory computer readable storage medium storing a set of program instructions for a server, the server including a communication interface configured to communicate with a terminal device, and a memory storing first correlation information for correlating first group identification information with both first device information and second device information, the first group identification information being for identifying a first group, the first device information being assigned to a first communication device, the second device information being assigned to a second communication device, the first correlation information indicating that the first group includes the first communication device and the second communication device, the set of program instructions comprising:

receiving the first group identification information and a first file from the terminal device;

in a first case where the first group identification information and the first file are received from the terminal device:

storing in the memory the first file and first authentication information to correlate both the first file and the first authentication information with the first group identification information; and transmitting the first authentication information to an external apparatus via the communication interface;

in a second case where device information matching the first device information correlated with the first group identification information and authentication information matching the first authentication information are received from the first communication device via the communication interface after the transmitting the first authentication information is performed, transmitting to the first communication device a second file generated using the first file which is stored correlated with the first authentication information in the memory; and in a third case where device information matching the second device information correlated with the first group identification information and authentication information matching the first authentication information are received from the second communication device via the communication interface after the transmitting the first authentication information is performed, transmitting to the second communication device the second file.

\* \* \* \* \*